United States Patent [19]

Heurteux

[11] 4,296,586

[45] Oct. 27, 1981

[54] FASTENING DEVICE FOR A HONEYCOMBED PANEL EMPLOYED IN PARTICULAR IN AERONAUTIC STRUCTURES

[75] Inventor: Bernard M. Heurteux, Verviers, Belgium

[73] Assignee: Shur-Lok International, S.A., Petit-Rechain, Belgium

[21] Appl. No.: 89,459

[22] Filed: Oct. 30, 1979

[30] Foreign Application Priority Data

Nov. 6, 1978 [FR] France .................................. 78 31314

[51] Int. Cl.³ ............................................... E04C 2/54
[52] U.S. Cl. .................................................... 52/787
[58] Field of Search ...................... 52/787, 806, 309.2; 16/2; 85/50 R

[56] References Cited

U.S. PATENT DOCUMENTS

| 2,667,447 | 8/1952 | Tuttle | 52/787 |
| 2,967,593 | 1/1961 | Cushman | 52/787 |
| 3,999,820 | 12/1976 | Haag | 52/787 X |

Primary Examiner—Carl D. Friedman
Attorney, Agent, or Firm—Holman & Stern

[57] ABSTRACT

The device comprises a tubular unit adapted to be placed in an opening formed in the honeycombed panel. A fastening member such as a screw, pin or other member, extends therethrough. The tubular unit comprises a sleeve which is placed in the opening of the panel and is connected to the skins of the latter by plates which are adhered to the outer surfaces of the panel. The plates ensure the transmission of in particular the transverse forces exerted on the device to the skins of the panel. The fastening device is intended in particular to be employed in panels constituting elements of the fuselage of aircraft and in particular the floors of the cabins.

2 Claims, 4 Drawing Figures

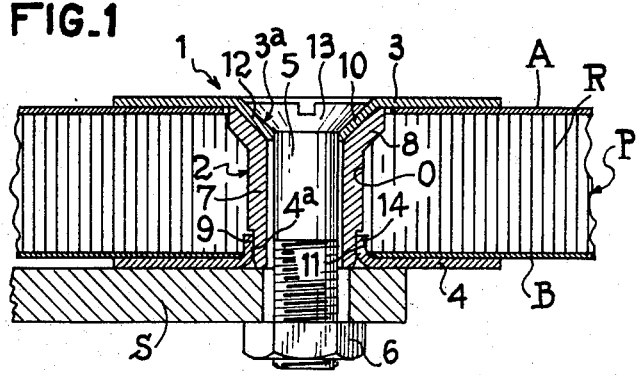
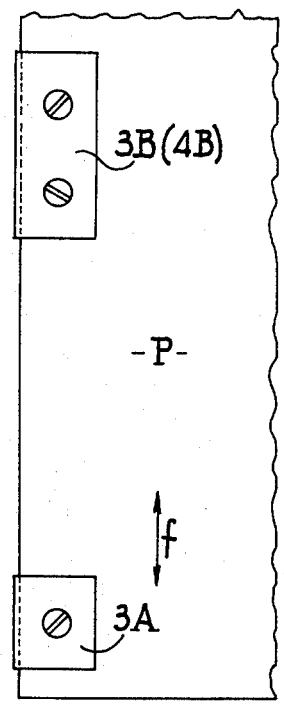
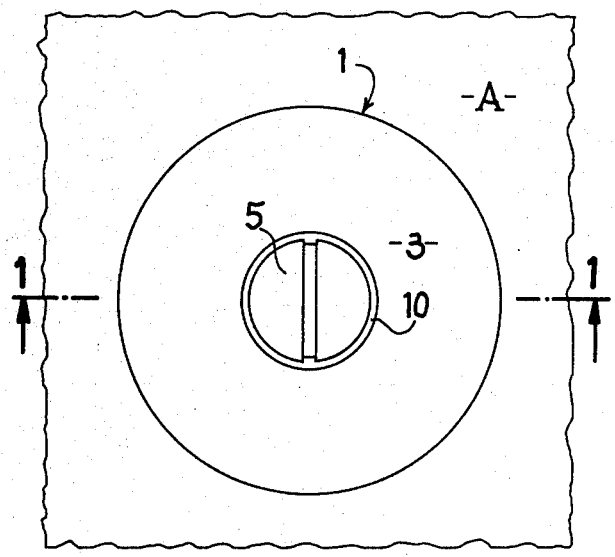
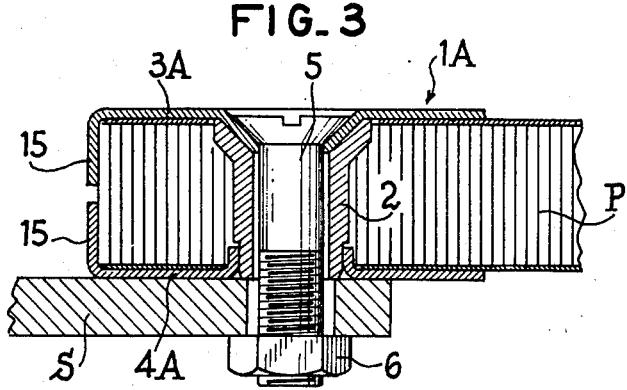

FASTENING DEVICE FOR A HONEYCOMBED PANEL EMPLOYED IN PARTICULAR IN AERONAUTIC STRUCTURES

DESCRIPTION

The present invention relates to a fastening device for honeycombed panels by means of which a constructional element, for example an aircraft, may be assembled with this panel.

Honeycombed panels are widely used in the aeronautic industry owing to their very advantageous stiffness/weight ratio. Such panels comprise a honeycombed network on the large sides of which are secured, for example by adhesion, layers or skins which impart thereto the desired strength. These panels are employed in particular for forming flooring in commercial aircraft.

In the course of the last few years, honeycombed panels have been considerably lightened owing to the use of high-strength fibres (glass or carbon fibres for example) in the skins covering the honeycombed network. The resulting increased strength permits, for a given load, a decrease in the thickness of the skins, on one hand, and a decrease in t the density of the cells of the honeycombed network, on the other, whence a considerable lightening of the panels.

The insertion in the panels of fastening devices already presented problems in respect of honeycombed networks of high density and this problem is more serious in respect of a low-density network. Experience has indeed shown that the conventional fastening devices (mechanical inserts or devices embedded in the adhesive etc..) give poor results, above all when the forces oriented roughly in the plane of the panel must be transmitted to the latter. Efforts have consequently been made to transmit such forces under more satisfactory conditions than before, which have resulted in fastening devices whose flat parts are assembled with the skins of the panel, that is to say the elements of the latter which have the greatest strength.

A known fastening device disclosed in U.S. Pat. No. 2,967,593 permits the transmission of the forces under these conditions and comprises three elements which extend in the form of a tubular unit through an opening formed in the panel, this unit consisting of a sleeve in which two end tubes are fitted. Each end tube has a flared portion at the respective mouth of the opening and a flat reinforcing member which bears against the respective skin surface of the panel in the zone immediately surrounding the opening. This tubular unit may receive a fastening member such as a screw, pin, stud or other means. The sleeve is so arranged that its ends are inserted under the edges of the openings of the skins and these edges are clamped between the flared portion of the tubes and the end faces of the sleeve so that the forces may be transmitted from the fastening device to the panel.

The fastening device just described satisfies the conditions of mechanical strength bearing in mind the forces which may be produced in emergency landings or sudden decelerations of the aircraft. However, it has in particular the following drawbacks:

bearing in mind that each tube of the tubular unit is in one piece, the amount of material which must be removed by machining is considerable, since the diameter of the flared portions (in the form of a washer) is distinctly larger than the diameter of the cylindrical part of the tube which is fitted with the centre sleeve; moreover, this amount of material increases with the magnitude of the force to be transmitted, since the greater the force the larger the required diameter of the flared portions of each tube;

when the fastening device is employed in a panel having a high bending strength, a bending fracture may appear in the region of connection of the flared portion to the cylindrical part of one of the tubes;

as the sleeve is inserted between the skins and is thereby maintained in the honeycombed network, the known arrangement practically can only be employed with panels whose skins are of metal (for example stainless steel) and is therefore incompatible with panels whose skins are made of plastics materials having carbon or glass fibre charges.

An object of the invention is to provide a fastening device which does not have these drawbacks and may be manufactured more cheaply than the device just described.

The invention provides a fastening device for a panel comprising a honeycombed network covered on both of its large sides with a skin imparting the required stiffness to the panel, said device comprising a sleeve placed in an opening formed transversely in the panel and adapted to have extending therethrough a fastening member such as a screw, pin or other member, and two strengthening means which are adapted to contribute to the connection of the sleeve with the skins of the panel, wherein said strengthening means comprise thin plates adhered to the respective skin of the panel in a region which surrounds the opening formed in the panel and having an area which distinctly exceeds the cross-sectional area of the sleeve, each plate comprising an opening in alignment with the sleeve, the edge portion of the opening of the plate being adapted to the shape of the corresponding end of the sleeve so as to ensure the transmission of transverse forces exerted on the sleeve by said fastening member to an area of the skins corresponding to at least the extent of said plates.

Further features of the invention will be apparent from the ensuing description which is given merely by way of example with reference to the accompanying drawings in which:

FIG. 1 is a cross-sectional view of a honeycombed panel provided with a fastening device according to the invention;

FIG. 2 is a plan view of the part of the panel shown in FIG. 1;

FIG. 3 shows another embodiment of the fastening device according to the invention placed in the marginal region of a honeycombed panel;

FIG. 4 shows a modification of the device according to the invention.

FIGS. 1 and 2 show a part of a panel P comprising a honeycombed network R covered on both sides with respective skins A and B. The fastening device 1 according to the invention comprises a sleeve 2 engaged in an opening 0 of the panel P, a first reinforcing or strengthening plate 3 or upper plate and a second reinforcing or strengthening plate 4 or lower plate, the assembly having extending therethrough a screw 5 on which a nut 6 is screwed. In the presently described embodiment, it is assumed that the panel P constitutes a part of the floor of an aircraft and that this panel is secured to the fuselage of the latter by means of a support arm S which is fastened against the panel by means of the nut 6.

The sleeve 2 has a cylindrical intermediate portion 7 to which is connected at the upper end a flared portion 8 which opens out on the outer surface of the skin A. At the opposite end, the sleeve 2 has a bearing surface 9 whose diameter is smaller than the diameter of the intermediate portion 7.

The plates 3 and 4 are preferably made from blanked and formed sheet metal and have a circular shape, for example, comprising respective pierced apertures 10 and 11. The edge portion of the aperture 10 of the plate 3 has a frustoconical flange 12 whose conicity is identical to that of the flared end portion 8 of the sleeve 2 and also to that of the head 13 of the screw 5.

The edge portion of the aperture 11 of the plate 4 has a flange 14 which extends at a right angle from the remainder of the plate 4, its inside diameter being such that the bearing surface 9 of the sleeve 2 is a tight interference fit therein.

The planar portions of the plates 3 and 4 are respectively secured by adhesion to the skins A and B in the regions surrounding the opening 0 of the panel P.

This device may be assembled in the following manner. The lower plate 4 is placed in position by centering it with respect to the opening 0 by means of the flange 14 and the plate is secured to the lower side of the panel P by means of an adhesive. Then the sleeve 2 is engaged in the opening 0 from the opposite side of the panel and forced into the flange 14 by its bearing surface 9. Thereafter, the upper plate 3 is placed in position so that its frusto-conical flange 12 is fitted in the flared portion 8 of the sleeve 2 and the plate 3 is adhered to the upper skin A of the panel P. After the latter has been placed in position, the screw 5 is inserted in the sleeve 2, the support arm S is engaged on the screw and the nut 6 is screwed tightly on the latter.

Owing to the fact that the plates 3 and 4 are manufactured separately by the blanking of a sheet, their cost is comparatively low. In addition to this, their dimension may be chosen to be as large as required for ensuring the stiffness of the assembly without this having a marked effect on this cost.

Further, the sleeve 2 may be made by machining on a lathe with no great difficulty and with minimum loss of material.

FIGS. 3 and 4 illustrate a particular advantage resulting from the use of the plates according to the invention. In this case, the fastening device 1A is adapted to be mounted on a part of the marginal region of the panel P. In order to increase the bending strength in a direction parallel to the edge of the panel (arrow f in FIG. 4), this fastening device comprises plates 3A and 4A having an edge portion 15 which is folded around the corresponding edge of the panel so as to form an L-shaped section. It will be clear that such a shape could not be obtained with machined tubes as in the prior art.

FIG. 4 also shows that the fastening device may be multiple in that it may comprise plates 3B, 4B (only the plate 3B is shown in the drawing) each of which has a plurality of apertures (two in the illustrated embodiment) which are each associated with a sleeve such as the sleeve 2 of FIGS. 1 to 3. In this way, the size of each fastening device may be chosen in accordance with the required stiffness of the connection to be achieved in the region of use of the fastening device.

It must be understood that the fastening device may be constructed in modified forms without departing from the scope of the invention. For example, the shape of one of the ends of the sleeve 2 may vary, in particular in accordance with the configuration of the screw 5 (or other fastening member). Interference force fits may be provided between the plates 3 and 4 and the two ends of the sleeve 2.

Having now described my invention what I claim as new and desire to secure by Letters Patent is:

1. A fastening device for mounting in a marginal region of a panel comprising a honeycombed network and skins respectively covering opposed large sides of the network and imparting a required stiffness to the panel, said device comprising a sleeve for placing in an opening formed transversely in the panel, the sleeve having opposed end portions of a given shape, a fastening member extending through the sleeve, and two strengthening means for contributing to the connection of the sleeve with the skins of the panel, said strengthening means comprising thin plates for respectively adhering to the skins of the panel in a region which surrounds the opening formed in the panel and having an area which distinctly exceeds the cross-sectional area of the sleeve, each plate comprising an aperture for substantial alignment with the sleeve, an edge portion of each plate defining the plate aperture substantially conforming to said given shape of the corresponding end portion of the sleeve so as to ensure the transmission of transverse forces exerted on the sleeve by said fastening member to an area of the skins corresponding to at least the extent of said plates, the aperture of at least one of the plates being bordered by an annular flange obtained by deformation of the plate and extending in a direction perpendicular to the general plane of the plate, the corresponding end portion of the sleeve having a bearing surface on which said flange is an interference fit, and at least one of the plates having a flange folded at a right angle for bearing against a lateral edge of the panel.

2. A fastening device for mounting in a marginal region of a panel comprising a honeycombed network and skins respectively covering opposed large sides of the network and imparting a required stiffness to the panel, said device comprising a sleeve for placing in an opening formed transversely in the panel, the sleeve having opposed longitudinally extending end portions of a given shape, a fastening member extending through the sleeve, and two strengthening means for contributing to the connection of the sleeve with the skins of the panel, said strenghening means comprising thin plates for respectively adhering to the skins of the panel in a region which surrounds the opening formed in the panel and having an area which distinctly exceeds the cross-sectional area of the sleeve, each plate comprising an aperture in alignment with the sleeve, an edge portion of each plate defining said plate aperture substantially conforming to said given shape of the corresponding end portion of the sleeve and being in fitting relation to said corresponding end portion of the sleeve so as to ensure the transmission of forces exerted on the sleeve by said fastening member transversely of the sleeve to an area of the skins corresponding to at least the extent of said plates, at least one of the plates being provided with a flange folded at a right angle for bearing against a lateral edge of the panel.

* * * * *